US009821534B2

(12) United States Patent
Harako et al.

(10) Patent No.: US 9,821,534 B2
(45) Date of Patent: Nov. 21, 2017

(54) GALVANNEALED STEEL SHEET

(75) Inventors: Daisuke Harako, Kurashiki (JP); Yusuke Fushiwaki, Chiyoda-ku (JP); Yoshitsugu Suzuki, Fukuyama (JP); Yasunobu Nagataki, Chiyoda-ku (JP)

(73) Assignee: JFE STEEL CORPORATION, Tokyo (JP)

( * ) Notice: Subject to any disclaimer, the term of this patent is extended or adjusted under 35 U.S.C. 154(b) by 482 days.

(21) Appl. No.: 14/373,809

(22) PCT Filed: Jun. 15, 2012

(86) PCT No.: PCT/JP2012/065926
§ 371 (c)(1), (2), (4) Date: Jan. 30, 2015

(87) PCT Pub. No.: WO2013/111362
PCT Pub. Date: Aug. 1, 2013

(65) Prior Publication Data

US 2015/0165727 A1 Jun. 18, 2015

(30) Foreign Application Priority Data

Jan. 23, 2012 (JP) ................................ 2012-010561

(51) Int. Cl.

| | |
|---|---|
| ***B32B 15/00*** | (2006.01) |
| ***B32B 15/01*** | (2006.01) |
| ***C23C 2/06*** | (2006.01) |
| ***C23C 2/28*** | (2006.01) |
| ***C21D 9/46*** | (2006.01) |
| ***C22C 18/00*** | (2006.01) |
| ***C22C 18/04*** | (2006.01) |
| ***C22C 38/00*** | (2006.01) |
| ***C22C 38/14*** | (2006.01) |
| ***C22C 38/02*** | (2006.01) |
| ***C22C 38/04*** | (2006.01) |
| ***C22C 38/12*** | (2006.01) |
| ***C22C 1/10*** | (2006.01) |
| ***C21D 8/02*** | (2006.01) |
| ***C21D 1/18*** | (2006.01) |
| ***C22C 38/06*** | (2006.01) |

(52) U.S. Cl.
CPC .............. *B32B 15/013* (2013.01); *C21D 1/18* (2013.01); *C21D 8/0226* (2013.01); *C21D 9/46* (2013.01); *C22C 1/10* (2013.01); *C22C 18/00* (2013.01); *C22C 18/04* (2013.01); *C22C 38/00* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/06* (2013.01); *C23C 2/28* (2013.01); *Y10T 428/12799* (2015.01)

(58) Field of Classification Search
None
See application file for complete search history.

(56) References Cited

U.S. PATENT DOCUMENTS

| | | | | |
|---|---|---|---|---|
| 2003/0003322 A1 | 1/2003 | Yamamoto | | |
| 2011/0217569 A1 | 9/2011 | Fushiwaki | | |
| 2013/0186523 A1* | 7/2013 | Ariga | C21D 8/021 | 148/507 |
| 2014/0349134 A1* | 11/2014 | Nagano | C22C 38/001 | 428/659 |

FOREIGN PATENT DOCUMENTS

| | | | | |
|---|---|---|---|---|
| EP | 0174019 | * | 3/1986 | C25D 15/02 |
| EP | 2009128 | | 12/2008 | |
| EP | 2327810 | * | 6/2011 | C22C 38/06 |
| EP | 2412842 | | 2/2012 | |
| EP | 2801634 | | 11/2014 | |
| JP | 64-000299 A | | 1/1989 | |
| JP | 64000299 | | 1/1989 | |
| JP | 02-263970 A | | 10/1990 | |
| JP | 10-081948 | | 3/1998 | |
| JP | H 11-200000 A | | 7/1999 | |
| JP | 2002-322543 A | | 11/2002 | |
| JP | 2003-321736 A | | 11/2003 | |
| JP | 2005-320556 A | | 11/2005 | |
| JP | 2006-022349 A | | 1/2006 | |
| KR | 1020110088551 | | 8/2011 | |
| KR | 1020140097536 | | 8/2014 | |

OTHER PUBLICATIONS

Hanes, W.M. "Physical Constants of Inorganic Compounds", Internet Version 2016, CRC Handbook of Chemistry and Physics, CRC Press/Taylor and Francis, 96$^{th}$ Ed., p. 4-96 and 4-99.*
Extended European Search Report dated Feb. 6, 2015 for European Application No. 12866457.0, 5 pages.
Korean Office Action dated May 27, 2016 for Korean Application No. 2014-7022104, including Concise Statement of Relevance, 18 pages.
International Search Report dated Sep. 18, 2012, application No. PCT/JP2012/065926.
Japanese Office Action with partial English language translation for JP 2012-010561, dated Jul. 28, 2015, 5 pages.
European Communication Pursuant to Article 94(3) for European Application No. 12866457.0, dated Jul. 17, 2017, 4 pages.

* cited by examiner

*Primary Examiner* — Seth Dumbris
(74) *Attorney, Agent, or Firm* — RatnerPrestia

(57) ABSTRACT

A galvannealed steel sheet includes a zinc coating layer containing 7 to 15% Fe on the surface of steel sheet including, C: 0.02% to 0.30%, Si: 0.01% to 2.5%, Mn: 0.1% to 3.0%, P: 0.003% to 0.08%, S: not more than 0.01%, Al: 0.001% to 0.20%, one or more selected from Ti: 0.03% to 0.40%, Nb: 0.001% to 0.2%, V: 0.001% to 0.2%, Mo: 0.01% to 0.5% and W: 0.001% to 0.2%. In the zinc coating layer, carbides with average particle size of 1 nm to 20 nm including one or more selected from titanium, niobium, vanadium, molybdenum and tungsten are present with a density of five or more particles per segment that is defined by the thickness of the coating layer and also by dividing a cross section of the coating layer at intervals of 1 μm in a direction perpendicular to the thickness of the coating layer.

4 Claims, No Drawings

GALVANNEALED STEEL SHEET

CROSS REFERENCE TO RELATED APPLICATIONS

This is the U.S. National Phase application of PCT/JP2012/065926, filed Jun. 15, 2012, which claims priority to Japanese Patent Application No. 2012-010561, filed Jan. 23, 2012, the disclosures of each of these applications being incorporated herein by reference in their entireties for all purposes.

FIELD OF THE INVENTION

The present invention relates to a galvannealed steel sheet suited as an automotive anticorrosion coated steel sheet which is excellent in corrosion resistance, coating adhesion and hydrogen brittleness resistance.

BACKGROUND OF THE INVENTION

Hot rolled steel sheets with tensile strength of 440 MPa or less have been conventionally used for parts such as frames and chassis of vehicles and trucks. However, automotive steel sheets having higher strength and smaller thickness are recently required in order to improve automobile crashworthiness and to preserve the global environment. Studies have been, therefore, launched for the use of high-strength hot rolled steel sheets with 590 MPa tensile strength, 780 MPa tensile strength, and 980 MPa or higher tensile strength.

Automobile parts frequently have complicated shapes imparted by press forming, and thus the material steel sheet requires high strength and excellent workability. On the other hand, the thickness reduction of steel sheet entails ensuring the corrosion resistance of car bodies. From this viewpoint, there has been a demand for coated steel sheets obtained by imparting corrosion resistance to the material steel sheet. In particular, galvannealed steel sheets have been desired which have excellent corrosion resistance and weldability and may be produced at low cost.

High-strength hot rolled steel sheets with excellent workability, high-strength galvanized steel sheets and the manufacturing methods thereof have been proposed. For example, Patent Literature 1 discloses a high-strength steel sheet with tensile strength of not less than 590 MPa and excellent workability, and a method for manufacturing such steel sheets. Specifically, a steel including, by mass %, C: 0.02 to 0.06%, Si≤0.3%, Mn: 0.5 to 2.0%, P≤0.06%, S≤0.005%, Al≤0.06%, N≤0.006%, Mo: 0.05 to 0.5%, Ti: 0.03 to 0.14%, and the balance being substantially Fe, is smelted and hot rolled under conditions in which the finishing delivery temperature is not less than 880° C. and the coiling temperature is not less than 570° C. The thus-obtained steel sheet has a microstructure which is substantially composed of a ferrite single phase and in which carbide precipitates containing titanium and molybdenum with average particle size of less than 10 nm are dispersed.

In a method disclosed in Patent Literature 2, a steel including, by mass %, C: 0.01 to 0.1%, Si≤0.3%, Mn: 0.2 to 2.0%, P≤0.04%, S≤0.02%, Al≤0.1%, N≤0.006%, Ti: 0.03 to 0.2%, one or both of Mo≤0.5% and W≤1.0%, and the balance being Fe and inevitable impurities is smelted and hot rolled in an austenite single phase region and coiled at not less than 550° C., thereby producing a ferrite single phase hot rolled steel sheet, and the steel sheet is further descaled and directly subjected to galvanization. The disclosed high-strength galvanized hot rolled steel sheet satisfies 4.8C+4.2Si+0.4Mn+2Ti≤2.5 in terms of mass %, has a microstructure with a ferrite area ratio of 98% or more, and less than 10 nm precipitates are dispersed in the microstructure, the precipitates containing titanium and one or both of molybdenum and tungsten while satisfying the atomic ratio (Mo+W)/(Ti+Mo+W)≥0.2.

Because Patent Literatures 1 and 2 involve the precipitation of fine carbides containing titanium and other elements such as molybdenum in ferrite, the coiling after the hot rolling is preferably performed at a coiling temperature (hereinafter, also written as CT) of 550° C. or above. When a hot rolled steel sheet containing such elements as silicon and manganese which are more prone to oxidation than iron (hereinafter, also written as easily oxidizable elements) is coiled at such a high CT, internal oxides containing such easily oxidizable elements are formed in the surface layer of the base steel sheet. As a result, the Zn—Fe alloying reaction is excessively promoted during the subsequent galvanization and alloying treatments, causing a deterioration in coating adhesion. Further, hot rolled steel sheets have a larger thickness than cold rolled steel sheets. Because of this fact, the coating film of galvanized hot rolled steel sheets undergoes larger compression strain during forming. Thus, coating adhesion is deteriorated to a further extent.

For example, an approach for improving coating adhesion is described in Patent Literature 3, which discloses a galvannealed steel sheet having excellent powdering resistance and excellent low-temperature chipping resistance. This galvannealed steel sheet is obtained by subjecting a galvanized steel sheet to alloying treatment and thereafter to mechanical extension control or pickling so as to produce 10 or more cracks per 1 mm on the surface of coating layer. Although coating adhesion is improved by the technique disclosed in Patent Literature 3, the fact that the coating layer has a high density of cracks gives rise to a concern that corrosion resistance may be deteriorated.

Patent Literature 4 discloses a technique which improves coating adhesion by obtaining smaller crystal grain boundaries on the steel sheet surface by performing grinding the base steel sheet before reduction annealing in a galvanizing line. However, the technique does not consider corrosion resistance and is also problematic in that the addition of a grinding facility increases the cost.

Patent Literature 5 discloses a galvannealed steel sheet with excellent corrosion resistance and coating adhesion which has a Mg-enriched layer at the surface layer of the Zn coating layer and also has a Ni—Fe—Al—Zn layer at the interface between the coating layer and the base steel sheet. However, an increase in cost is of concern because the production entails a facility for performing Ni precoating before reduction annealing and also because expensive elements such as magnesium and nickel are added. Further, the bath composition used in the coating treatment is different from that of a zinc coating bath used in a common galvanizing line. Thus, the implementation of the disclosed technique is difficult due to facility cost and operation control.

It is known that steel sheets having tensile strength of 980 MPa or above suffer hydrogen brittleness by the entry of hydrogen into the steel. Thus, there is urgency in developing a technique capable of improving hydrogen brittleness resistance of high-strength hot rolled steel sheets with 980 MPa or higher tensile strength.

However, any of the techniques disclosed in Patent Literatures 1 to 5 does not consider how to improve hydrogen brittleness resistance when the techniques are applied to high-strength steel sheets with 980 MPa or higher tensile strength.

PATENT LITERATURE

[PTL 1] Japanese Unexamined Patent Application Publication No. 2002-322543

[PTL 2] Japanese Unexamined Patent Application Publication No. 2003-321736

[PTL 3] Japanese Unexamined Patent Application Publication No. 11-200000

[PTL 4] Japanese Unexamined Patent Application Publication No. 10-81948

[PTL 5] Japanese Unexamined Patent Application Publication No. 2005-320556

SUMMARY OF THE INVENTION

The present invention has been made in view of the aforementioned circumstances. It is therefore an object of the invention to provide a galvannealed steel sheet which has excellent adhesion of the coating layer while ensuring corrosion resistance and which achieve excellent hydrogen brittleness resistance even when the base steel sheets are high-strength steel sheets with 980 MPa or higher tensile strength.

The present inventors studied hard on coating treatments for high-strength hot rolled steel sheets. As a result, the present inventors have found that coating adhesion and hydrogen brittleness resistance are improved while ensuring corrosion resistance, by dispersing nano-sized fine carbides including one, or two or more of titanium, niobium, vanadium, molybdenum and tungsten in the coating layer of a galvannealed steel sheet. When a coated steel sheet undergoes compression strain during press forming, cracks occur and propagate along the interface between the coating layer and the base steel sheet. The improvement in coating adhesion is probably ascribed to a mechanism in which the fine carbides that have been dispersed produce a pinning effect at sites where cracks have occurred, and this pinning effect restrains the propagation of cracks, preventing the occurrence of significant deterioration in coating adhesion. It is also probable that the fine carbides serve as trap sites against the entry of hydrogen to suppress an increase in the concentration of diffusible hydrogen in the steel sheet and thereby to control the sensitivity to delayed fracture.

The present invention is based on the above findings. Features of the invention include the following.

[1] A galvannealed steel sheet including a zinc coating layer on the surface of steel sheet, the zinc coating layer containing 7 to 15 mass % Fe, the steel sheet having a chemical composition comprising, by mass %, C: 0.02% to 0.30%, Si: 0.01% to 2.5%, Mn: 0.1% to 3.0%, P: 0.003% to 0.08%, S: not more than 0.01%, Al: 0.001% to 0.20%, one, or two or more selected from Ti: 0.03% to 0.40%, Nb: 0.001% to 0.2%, V: 0.001% to 0.5%, Mo: 0.01% to 0.5% and W: 0.001% to 0.2%, and the balance comprising Fe and inevitable impurities, the zinc coating layer containing carbides including one, or two or more selected from titanium, niobium, vanadium, molybdenum and tungsten, the carbides having average particle size of 1 nm to 20 nm, the carbides having a density of five or more particles per segment, the segment being defined by dividing a cross section of the coating layer at intervals of 1 μm in a direction perpendicular to the direction of the thickness of the coating layer ($t_1$ μm), the segment hence having an area represented by ($t_1 \times 1$ (μm$^2$)).

[2] The galvannealed steel sheet described in [1], wherein the chemical composition of the steel sheet further includes, by mass %, B: 0.0002% to 0.005%.

[3] The galvannealed steel sheet described in [1] or [2], wherein the steel sheet is a hot rolled steel sheet.

In the invention, the term high strength indicates tensile strength TS of not less than 590 MPa. The galvannealed steel sheet of the invention includes both a cold rolled steel sheet and a hot rolled steel sheet.

The galvannealed steel sheet obtained according to the present invention achieves excellent corrosion resistance, coating adhesion and hydrogen brittleness resistance. Because of the coating layer containing fine carbides including one, or two or more selected from titanium, niobium, vanadium, molybdenum and tungsten, the galvannealed steel sheet of the invention exhibits excellent corrosion resistance, coating adhesion and hydrogen brittleness resistance even when the base steel sheet is a high-strength hot rolled steel sheet. Thus, the inventive galvannealed steel sheet is highly useful for parts such as frames and chassis of automobiles.

DETAILED DESCRIPTION OF EMBODIMENTS OF THE INVENTION

Hereinbelow, the present invention will be described in detail with reference to exemplary embodiments. In the following description, the unit for the contents of elements in the chemical composition of steel is “mass %” and is simply written as “%” unless otherwise mentioned.

Embodiments of present invention will be described in detail hereinbelow.

(1) Chemical Composition of Base Steel Sheet

C: 0.02% to 0.30%

Carbon precipitates carbides in the steel sheet. To obtain this effect, 0.02% or more carbon is required. On the other hand, any C content exceeding 0.30% causes a decrease in weldability. Thus, the upper limit is defined to be 0.30%.

Si: 0.01% to 2.5%

Silicon is an effective solid solution strengthening element. To obtain the strengthening effect, 0.01% or more silicon is required. If, on the other hand, silicon is present in a large amount exceeding 2.5%, silicon oxides become concentrated on the steel sheet surface during the annealing process to cause an occurrence of bare-spot defects or a decrease in coating adhesion. Thus, the upper limit is defined to be 2.5%.

Mn: 0.1% to 3.0%

Manganese is added to increase strength. To obtain the strengthening effect, 0.1% or more manganese is required. If, on the other hand, more than 3.0% manganese is added, manganese oxides become concentrated on the steel sheet surface during the annealing process to cause an occurrence of bare-spot defects or a decrease in coating adhesion. Thus, the upper limit is defined to be 3.0%. The Mn content is preferably 0.6% to 3.0%.

P: 0.003% to 0.08%

Phosphorus is an element that is inevitably contained in steel. Decreasing the P content to below 0.003% gives rise to a concern that the cost may be increased. Thus, the P content is defined to be not less than 0.003%. On the other hand, weldability is deteriorated if more than 0.08% phosphorus is contained. Further, such a high P content deteriorates surface quality and entails a high alloying temperature in the alloying treatment to obtain a desired degree of alloying. Increasing the alloying temperature to obtain a desired degree of alloying causes a decrease in ductility and also a decrease in the adhesion of the alloyed coating layer. Thus, the P content is defined to be not more than 0.08% in order to achieve a desired degree of alloying, good ductility and good adhesion of the alloyed coating layer.

S: not more than 0.01%

Sulfur is segregated in grain boundaries. Further, toughness is lowered if MnS is generated in a large amount. In view of these, the S content is preferably controlled to not more than 0.01%. The lower limit of the S content is not particularly specified, and the S content may be at an impurity level.

Al: 0.001% to 0.20%

Aluminum is added for the purpose of deoxidation of molten steel. However, this purpose is not fulfilled if the Al content is less than 0.001%. On the other hand, adding more than 0.2% aluminum results in an occurrence of large amounts of inclusions, causing defects in steel sheet. Thus, the Al content is defined to be 0.001% to 0.20%.

The steel sheet contains one, or two or more selected from Ti: 0.03% to 0.40%, Nb: 0.001% to 0.2%, V: 0.001% to 0.5%, Mo: 0.01% to 0.5% and W: 0.001% to 0.2%. Titanium, niobium, vanadium, molybdenum and tungsten precipitate carbides in the steel sheet, and one, or two or more selected from these elements are added. In particular, titanium is an effective element due to its high precipitation strengthening ability and also from the viewpoint of cost. However, the addition of less than 0.03% titanium does not allow carbides to be precipitated in steel in an amount enough for carbides to diffuse into the coating layer. Adding more than 0.40% titanium saturates the effect and only increases the cost. Thus, the content of titanium, when added, is defined to be 0.03% to 0.40%. For similar reasons as titanium, the contents of niobium, vanadium, molybdenum and tungsten are defined to be Nb: 0.001% to 0.2%, V: 0.001% to 0.5%, Mo: 0.01% to 0.5% and W: 0.001% to 0.2%.

B: 0.0002% to 0.005%

Boron is an effective element for improving hardenability. However, the hardenability enhancing effect cannot be fully obtained by adding less than 0.0002% boron. On the other hand, adding more than 0.005% boron saturates the effect and only increases the cost. Thus, the content of boron, when added, is defined to be 0.0002% to 0.005%.

The balance is iron and inevitable impurities.

(2) Average Particle Size and Density of Carbides in Coating Layer

The inventive galvannealed steel sheet achieves an improvement in coating adhesion and hydrogen brittleness resistance while ensuring corrosion resistance, by the dispersing of fine carbides including one, or two or more selected from titanium, niobium, vanadium, molybdenum and tungsten in the coating layer.

The average particle size of the carbides present in the coating layer of the inventive galvannealed steel sheet is defined to be preferably 1 nm to 20 nm. If the average particle size is less than 1 nm, the carbides produce only a weak pinning effect for cracks occurring in the coating layer during forming, failing to provide an improvement in coating adhesion. If the average particle size exceeds 20 nm, the coating layer itself becomes brittle because such coarse carbides serve as a starting point of fine cracks in the coating layer during forming. In the invention, the average particle size indicates the diameter of a circle having the same area as the average of areas (the average area) of randomly selected twenty carbide particles observed with respect to a cross section of the coating layer.

In the inventive galvannealed steel sheet, the carbides including one, or two or more selected from titanium, niobium, vanadium, molybdenum and tungsten preferably have a density of five or more particles per segment wherein the segment is defined by dividing a cross section of the coating layer at intervals of 1 μm in a direction perpendicular to the direction of the thickness of the coating layer ($t_1$ μm), and hence the segment has an area represented by ($t_1 \times 1$ (μm$^2$)). The carbides having a density of five or more particles achieve a higher effectiveness in improving coating adhesion and hydrogen brittleness resistance. Although the upper limit is not particularly limited, the density is preferably not more than 50 particles because the presence of more than 50 particles saturates the effectiveness in improving coating adhesion and hydrogen brittleness resistance.

In the inventive galvannealed steel sheet, the carbides may be distributed with any configuration without limitation. That is, the advantageous effect of the invention may be obtained irrespective of whether the carbides are concentrated in the vicinity of the interface between the coating layer and the base steel sheet or are dispersed in the entirety of the coating layer. Further, the shapes of the carbides are not particularly limited, and the advantageous effect of the invention may be obtained with such shapes as spherical or ellipsoidal shapes.

The density, the particle size and the composition of carbides may be determined by the following methods. For example, the steel sheet may be processed with a focused ion beam machine (FIB) to give a sectional slice including the coating layer, which is then observed with a transmission electron microscope (TEM) and analyzed with an energy dispersive X-ray detector (EDX) to determine the composition.

The carbides may be supplied into the coating layer by galvanizing a steel sheet in which carbides have been precipitated and thereafter performing an alloying treatment to cause the carbides to be diffused from the surface layer of the base steel sheet into the coating layer. An effective method for this is to apply a jet stream of the coating metal to the steel sheet in a coating bath. The application of a jet stream of the coating metal increases the amount of carbides diffused from the base steel sheet surface to the coating layer and allows the carbides to have a density in the coating layer specified in the present invention. The application of a jet stream of the coating metal is desirably conducted using slit nozzles with a constant width to permit uniform application over the entire width of the base steel sheet.

(3) Composition of Coating Layer

In the inventive galvannealed steel sheet, the Fe content in the zinc coating layer is defined to be preferably 7 to 15%. Any Fe content less than 7% does not allow sufficient Zn—Fe alloying reaction, and consequently the carbides are not sufficiently diffused from the base steel sheet into the coating layer, failing to provide an improvement in coating adhesion and hydrogen brittleness resistance. If, on the other hand, the Fe content exceeds 15%, the Zn—Fe alloying reaction proceeds too far with the result that a brittle Γ phase is formed with a large thickness near the interface between the coating layer and the base steel sheet, causing a decrease in coating adhesion.

To ensure corrosion resistance, the amount of the coating per surface is preferably not less than 10 g/m$^2$. From the viewpoints of cost and coating adhesion, the amount of the coating per surface is preferably not more than 90 g/m$^2$.

(4) Method for Manufacturing a Galvannealed Steel Sheet

The inventive galvannealed steel sheet may be obtained by smelting a steel with the aforementioned chemical composition, hot rolling the steel at a finishing delivery temperature of not less than 850° C., coiling the hot rolled steel sheet at a coiling temperature of not more than 540° C., and annealing the steel sheet at a maximum steel sheet temperature of 500° C. to 800° C., thereafter galvanizing the steel sheet, and heating the steel sheet at a temperature of 400° C. to 550° C. to perform an alloying treatment.

Finishing delivery temperature: not less than 850° C.

If the finishing delivery temperature is less than 850° C., the rolling takes place in the absence of recrystallization and induces the accumulation of an increased amount of strain, thus causing an increase in rolling load. In view of this, the finishing delivery temperature for the inventive galvannealed steel sheet is defined to be preferably not less than 850° C. Although the upper limit is not particularly limited, the finishing delivery temperature is preferably not more than 1100° C.

Coiling temperature: not more than 540° C.

If the coiling temperature exceeds 540° C., easily oxidizable elements are allowed to form an internal oxide layer and the Zn—Fe alloying reaction is excessively promoted during the subsequent galvanization and alloying treatments, resulting in a deterioration in coating adhesion. Thus, the coiling temperature for the inventive galvannealed steel sheet is defined to be preferably not more than 540° C.

Maximum steel sheet temperature reached during annealing: 500° C. to 800° C.

The steel sheet is annealed at a maximum steel sheet temperature of 500° C. to 800° C. in, for example, in a reducing atmosphere furnace of a galvanizing line. If the temperature is less than 500° C., carbides are not precipitated in the steel sheet. The failure of the precipitation of carbides not only causes a deterioration in strength and workability but also leads to a failure of the dispersion of carbides in the coating layer during the subsequent galvanization and alloying treatments, resulting in a deterioration in coating adhesion and hydrogen brittleness resistance. If, on the other hand, the maximum temperature exceeds 800° C., the particulate carbides precipitated in the steel sheet are coarsened to cause deterioration in strength and workability and also cause an embrittlement of the coating layer. Further, such high temperatures allow easily oxidizable elements such as silicon and manganese to be concentrated at the surface to form oxides, causing an occurrence of bare-spot defects.

The galvanized steel sheet is further heated to a temperature at 400° C. to 550° C. to perform an alloying treatment.

If the alloying temperature is less than 400° C., the Zn—Fe alloying reaction rate is low and the particulate carbides are not diffused sufficiently from the base steel sheet into the coating layer. At temperatures exceeding 550° C., the Zn—Fe alloying reaction proceeds too far, resulting in deterioration in coating adhesion.

EXAMPLE 1

Slabs with chemical compositions described in Table 1 were heated at 1250° C., hot rolled under hot rolling conditions described in Table 2, and pickled to remove scales. Thus, hot rolled steel sheets with a thickness of 2.3 mm were produced.

Next, the steel sheets were subjected to an annealing treatment, and further to a galvanization treatment and an alloying treatment in a CGL. The annealing treatment was performed in a 5% $H_2$—$N_2$ atmosphere having a dew point of −35° C., at a maximum steel sheet temperature shown in Table 2. After being cooled to 470° C., the steel sheets were galvanized by being dipped into a galvanizing bath at a bath temperature of 460° C. (bath composition: Zn-0.13 mass % Al-0.03 mass % Fe). During the dipping of the steel sheet into the coating bath, a jet stream was applied to both surfaces of the steel sheet at an exit speed of 0.3 m/s through coating metal ejection nozzles with a slit width of 0.10 mm which had been disposed 10 cm away from the both surfaces of the steel sheet between a sink roll and support rolls in the coating bath. After the galvanization, the alloying treatment was carried out for approximately 20 seconds at alloying temperatures shown in Table 2. In this manner, the galvannealed steel sheets were manufactured.

The galvannealed steel sheet was treated with a 5% aqueous HCl solution containing an inhibitor to dissolve the coating layer alone. The Zn, Fe and Al concentrations in the solution were measured by ICP, thereby determining the Fe content in the coating layer. Further, the amount of the coating was obtained from the difference in weight between before and after the removal of the coating layer. To determine the number of carbide particles per segment in the coating layer and also to measure the average particle size of the carbides, a sectional slice including the coating layer was obtained with FIB and was subjected to TEM observation and EDX composition analysis. The density was evaluated as "Present" when five or more carbide particles were present per segment, and was evaluated as "Absent" when there were less than five particles.

To evaluate the workability of the galvannealed steel sheets, JIS No. 5 tensile test pieces were obtained from samples along a direction that was 90° to the rolling direction. A tensile test was performed in accordance with JIS Z 2241 with a constant cross head speed of 10 mm/min to measure tensile strength (TS (MPa)) and elongation (El (%)). The workability was evaluated as good when TS×El≥15000 and as poor when TS×El<15000.

The coating adhesion of the galvannealed steel sheets was evaluated by the following powdering test.

A pressure-sensitive adhesive tape was applied to the coated steel sheet. The steel sheet was bent 90° and then bent back with a bending radius of 5 mm such that the tape-coated side would be inside. The tape was then released and analyzed with fluorescent X-rays. The count of zinc per unit length was obtained as the amount of coating separation. To evaluate powdering resistance, the amounts of coating separation obtained by the above powdering test were compared to the following criteria and were ranked 1 (Good, ⊙), 2 (Generally good, ○) and 3 (Bad, x). The ranks ⊙ and ○ are acceptable.

Amounts of Coating Separation: Ranks 0-less than 3000: 1 (Good (⊙))

3000-less than 6000: 2 (Good (○))

6000 or more: 3 (Bad (x))

To evaluate the corrosion resistance of the galvannealed steel sheets, 70 mm×150 mm test pieces were subjected to a 3-day salt spray test in accordance with JIS Z 2371 (2000). The resultant rust was washed away with chromic acid (concentration: 200 g/L, 80° C.) for 1 minute. The corrosion weight loss of the coating (g/m$^2$·day) per side between before and after the test was obtained by a gravimetric method and was evaluated based on the following criteria.

Good (○): less than 20 $g/m^2 \cdot day$

Bad (x): 20 $g/m^2 \cdot day$ or more

To evaluate the hydrogen brittleness resistance of the galvannealed steel sheets, 150 mm×30 mm rectangular test pieces were bent with a bending radius of 5 mm, then soaked into 0.5 mol/L sulfuric acid together with a waterproof strain gauge attached to the surface of the test piece, and electrolyzed by passing a current having a current density of 0.1 $mA/cm^2$ through the test piece so as to cause hydrogen to enter the test piece. The occurrence of cracks after 2-hour energization was evaluated based on the following criteria.

Good (○): No crack occurred.

Bad (x): Crack occurred.

The production conditions and the results are described in Table 2.

TABLE 1

Mass %

| Steel No. | C | Si | Mn | P | S | Al | Ti | Nb | V | Mo | W | B | Remarks |
|---|---|---|---|---|---|---|---|---|---|---|---|---|---|
| A | 0.03 | 0.05 | 0.9 | 0.005 | 0.001 | 0.005 | 0.05 | 0.02 | 0 | 0 | 0 | 0 | Inv. Ex. |
| B | 0.05 | 0.05 | 1.2 | 0.005 | 0.001 | 0.005 | 0.08 | 0.05 | 0 | 0 | 0 | 0 | Inv. Ex. |
| C | 0.10 | 0.05 | 1.7 | 0.005 | 0.001 | 0.005 | 0.12 | 0.19 | 0 | 0 | 0 | 0 | Inv. Ex. |
| D | 0.06 | 0.05 | 1.2 | 0.005 | 0.001 | 0.005 | 0.10 | 0 | 0.08 | 0 | 0 | 0 | Inv. Ex. |
| E | 0.09 | 0.05 | 1.7 | 0.005 | 0.001 | 0.005 | 0.15 | 0 | 0.24 | 0 | 0 | 0 | Inv. Ex. |
| F | 0.15 | 0.05 | 1.5 | 0.005 | 0.001 | 0.005 | 0.11 | 0 | 0.48 | 0 | 0 | 0 | Inv. Ex. |
| G | 0.04 | 0.05 | 0.6 | 0.005 | 0.001 | 0.005 | 0.09 | 0 | 0 | 0.10 | 0 | 0 | Inv. Ex. |
| H | 0.06 | 0.05 | 1.2 | 0.005 | 0.001 | 0.005 | 0.10 | 0 | 0 | 0.21 | 0 | 0 | Inv. Ex. |
| I | 0.10 | 0.05 | 1.1 | 0.005 | 0.001 | 0.005 | 0.15 | 0 | 0 | 0.40 | 0 | 0 | Inv. Ex. |
| J | 0.04 | 0.05 | 1.0 | 0.005 | 0.001 | 0.005 | 0.13 | 0 | 0 | 0 | 0.02 | 0 | Inv. Ex. |
| K | 0.09 | 0.05 | 1.3 | 0.005 | 0.001 | 0.005 | 0.18 | 0 | 0 | 0 | 0.09 | 0 | Inv. Ex. |
| L | 0.11 | 0.05 | 1.4 | 0.005 | 0.001 | 0.005 | 0.19 | 0 | 0 | 0 | 0.16 | 0 | Inv. Ex. |
| M | 0.03 | 0.05 | 0.7 | 0.005 | 0.001 | 0.005 | 0.02 | 0 | 0 | 0 | 0 | 0 | Comp. Ex. |
| N | 0.03 | 0.05 | 0.7 | 0.005 | 0.001 | 0.005 | 0.04 | 0 | 0 | 0 | 0 | 0 | Inv. Ex. |
| O | 0.03 | 0.05 | 0.6 | 0.005 | 0.001 | 0.005 | 0.07 | 0 | 0 | 0 | 0 | 0 | Inv. Ex. |
| P | 0.03 | 0.05 | 0.6 | 0.005 | 0.001 | 0.005 | 0.07 | 0 | 0 | 0 | 0 | 0.0002 | Inv. Ex. |
| Q | 0.03 | 0.05 | 0.6 | 0.005 | 0.001 | 0.005 | 0.07 | 0 | 0 | 0 | 0 | 0.0005 | Inv. Ex. |
| R | 0.03 | 0.05 | 0.6 | 0.005 | 0.001 | 0.005 | 0.08 | 0 | 0 | 0 | 0 | 0.0011 | Inv. Ex. |
| S | 0.03 | 0.05 | 0.6 | 0.005 | 0.001 | 0.005 | 0.07 | 0 | 0 | 0 | 0 | 0.0019 | Inv. Ex. |
| T | 0.03 | 0.05 | 0.6 | 0.005 | 0.001 | 0.005 | 0.07 | 0 | 0 | 0 | 0 | 0.0040 | Inv. Ex. |
| U | 0.04 | 0.05 | 0.2 | 0.005 | 0.001 | 0.005 | 0.10 | 0 | 0 | 0 | 0 | 0.0008 | Inv. Ex. |
| V | 0.04 | 0.05 | 0.2 | 0.005 | 0.001 | 0.005 | 0.10 | 0 | 0 | 0 | 0 | 0.0016 | Inv. Ex. |
| W | 0.04 | 0.05 | 0.2 | 0.005 | 0.001 | 0.005 | 0.10 | 0 | 0 | 0 | 0 | 0.0047 | Inv. Ex. |
| X | 0.03 | 0.05 | 0.2 | 0.005 | 0.001 | 0.005 | 0.08 | 0 | 0 | 0 | 0 | 0.0030 | Inv. Ex. |
| Y | 0.05 | 0.05 | 0.5 | 0.005 | 0.001 | 0.005 | 0.14 | 0 | 0 | 0 | 0 | 0 | Inv. Ex. |
| Z | 0.05 | 0.05 | 0.4 | 0.005 | 0.001 | 0.005 | 0.14 | 0 | 0 | 0 | 0 | 0.0003 | Inv. Ex. |
| AA | 0.05 | 0.05 | 0.3 | 0.005 | 0.001 | 0.005 | 0.12 | 0 | 0 | 0 | 0 | 0.0021 | Inv. Ex. |
| AB | 0.10 | 0.05 | 1.2 | 0.005 | 0.001 | 0.005 | 0.19 | 0 | 0.07 | 0 | 0 | 0 | Inv. Ex. |
| AC | 0.09 | 0.05 | 1.2 | 0.005 | 0.001 | 0.005 | 0.17 | 0 | 0 | 0.15 | 0 | 0 | Inv. Ex. |
| AD | 0.09 | 0.05 | 1.0 | 0.005 | 0.001 | 0.005 | 0.14 | 0 | 0.09 | 0 | 0 | 0.0002 | Inv. Ex. |
| AE | 0.09 | 0.05 | 0.5 | 0.005 | 0.001 | 0.005 | 0.14 | 0 | 0.09 | 0 | 0 | 0.0020 | Inv. Ex. |
| AF | 0.08 | 0.05 | 1.4 | 0.005 | 0.001 | 0.005 | 0.21 | 0 | 0 | 0 | 0 | 0 | Inv. Ex. |
| AG | 0.13 | 0.05 | 1.7 | 0.005 | 0.001 | 0.005 | 0.38 | 0 | 0 | 0 | 0 | 0 | Inv. Ex. |
| AH | 0.01 | 0.05 | 0.7 | 0.005 | 0.001 | 0.005 | 0.07 | 0 | 0.11 | 0 | 0 | 0 | Comp. Ex. |
| AI | 0.02 | 0.05 | 0.9 | 0.005 | 0.001 | 0.005 | 0.05 | 0.01 | 0 | 0.05 | 0 | 0 | Inv. Ex. |
| AJ | 0.16 | 0.05 | 1.4 | 0.005 | 0.001 | 0.005 | 0.15 | 0.05 | 0 | 0.15 | 0 | 0 | Inv. Ex. |
| AK | 0.28 | 0.05 | 1.7 | 0.005 | 0.001 | 0.005 | 0.35 | 0.10 | 0 | 0.30 | 0 | 0 | Inv. Ex. |
| AL | 0.07 | 0.40 | 0.7 | 0.005 | 0.001 | 0.005 | 0.15 | 0 | 0.15 | 0 | 0 | 0 | Inv. Ex. |
| AM | 0.07 | 0.70 | 2.0 | 0.005 | 0.001 | 0.005 | 0.15 | 0 | 0.15 | 0 | 0 | 0 | Inv. Ex. |
| AN | 0.07 | 0.70 | 2.9 | 0.005 | 0.001 | 0.005 | 0.15 | 0 | 0.15 | 0 | 0 | 0 | Inv. Ex. |
| AO | 0.07 | 0.70 | 3.1 | 0.005 | 0.001 | 0.005 | 0.15 | 0 | 0.15 | 0 | 0 | 0 | Comp. Ex. |
| AP | 0.07 | 1.40 | 1.5 | 0.005 | 0.001 | 0.005 | 0.15 | 0 | 0.15 | 0 | 0 | 0 | Inv. Ex. |
| AQ | 0.07 | 2.40 | 1.5 | 0.005 | 0.001 | 0.005 | 0.15 | 0 | 0.15 | 0 | 0 | 0 | Inv. Ex. |
| AR | 0.07 | 2.60 | 1.5 | 0.005 | 0.001 | 0.005 | 0.15 | 0 | 0.15 | 0 | 0 | 0 | Comp. Ex. |

TABLE 2-1

| | | Hot rolling conditions | | CGL conditions | | Properties of coating layer | | | |
|---|---|---|---|---|---|---|---|---|---|
| Level | Steel No. | Finishing delivery temp. (° C.) | Coiling temp. (° C.) | Annealing temp. (max. steel sheet temp.) (° C.) | Alloying temp. (° C.) | Amount of coating ($g/m^2$) | Fe content in coating layer (mass %) | Density of carbide particles per segment in coating layer | Average particle size of carbides in coating layer (nm) |
| 1 | A | 920 | 500 | 710 | 470 | 45 | 10.1 | Present | 9 |
| 2 | B | 1000 | 490 | 700 | 480 | 55 | 10.3 | Present | 7 |
| 3 | C | 900 | 480 | 670 | 490 | 45 | 11.4 | Present | 3 |
| 4 | D | 990 | 510 | 700 | 460 | 50 | 11.0 | Present | 9 |
| 5 | E | 960 | 500 | 700 | 470 | 45 | 11.5 | Present | 5 |
| 6 | E | 960 | 480 | 720 | 380 | 50 | 6.2 | Absent | — |
| 7 | E | 960 | 480 | 710 | 400 | 50 | 7.8 | Present | 9 |

TABLE 2-1-continued

| | | Hot rolling conditions | | CGL conditions | | Properties of coating layer | | | |
|---|---|---|---|---|---|---|---|---|---|
| Level | Steel No. | Finishing delivery temp. (° C.) | Coiling temp. (° C.) | Annealing temp. (max. steel sheet temp.) (° C.) | Alloying temp. (° C.) | Amount of coating (g/m$^2$) | Fe content in coating layer (mass %) | Density of carbide particles per segment in coating layer | Average particle size of carbides in coating layer (nm) |
| 8 | E | 960 | 480 | 750 | 450 | 50 | 10.7 | Present | 5 |
| 9 | E | 960 | 480 | 750 | 540 | 50 | 14.5 | Present | 4 |
| 10 | E | 960 | 480 | 750 | 560 | 50 | 15.8 | Present | 8 |
| 11 | E | 950 | 470 | 480 | 460 | 50 | 11.9 | Absent | — |
| 12 | E | 950 | 490 | 520 | 460 | 50 | 10.7 | Present | 4 |
| 13 | E | 950 | 500 | 790 | 480 | 50 | 11.2 | Present | 14 |
| 14 | E | 950 | 500 | 810 | 480 | 50 | 11.6 | Present | 25 |
| 15 | E | 950 | 540 | 690 | 470 | 50 | 14.0 | Present | 10 |
| 16 | E | 950 | 550 | 690 | 470 | 50 | 15.5 | Present | 13 |
| 17 | E | 870 | 480 | 700 | 470 | 50 | 9.9 | Present | 12 |
| 18 | E | 1050 | 480 | 700 | 460 | 50 | 10.4 | Present | 8 |
| 19 | E | 940 | 490 | 720 | 470 | 10 | 13.0 | Present | 7 |
| 20 | E | 940 | 490 | 640 | 470 | 60 | 10.4 | Present | 8 |
| 21 | E | 940 | 510 | 680 | 480 | 90 | 12.0 | Present | 8 |
| 22 | E | 940 | 520 | 730 | 480 | 100 | 12.5 | Present | 7 |
| 23 | F | 940 | 490 | 670 | 470 | 40 | 11.0 | Present | 10 |
| 24 | G | 940 | 520 | 700 | 480 | 40 | 11.3 | Present | 5 |
| 25 | H | 940 | 520 | 700 | 480 | 45 | 10.5 | Present | 4 |
| 26 | I | 950 | 500 | 670 | 470 | 45 | 10.7 | Present | 7 |
| 27 | J | 970 | 490 | 700 | 480 | 45 | 10.1 | Present | 10 |
| 28 | K | 980 | 490 | 700 | 480 | 45 | 11.0 | Present | 8 |
| 29 | L | 980 | 490 | 700 | 480 | 45 | 10.9 | Present | 10 |
| 30 | M | 950 | 500 | 700 | 470 | 45 | 11.5 | Absent | — |
| 31 | N | 950 | 500 | 700 | 470 | 45 | 12.4 | Present | 10 |
| 32 | O | 950 | 500 | 700 | 470 | 45 | 10.7 | Present | 2 |
| 33 | P | 950 | 500 | 700 | 470 | 45 | 11.0 | Present | 5 |
| 34 | Q | 950 | 500 | 700 | 470 | 45 | 10.2 | Present | 6 |
| 35 | R | 950 | 500 | 700 | 470 | 45 | 11.0 | Present | 8 |
| 36 | S | 950 | 500 | 700 | 470 | 45 | 10.7 | Present | 8 |
| 37 | T | 950 | 500 | 700 | 470 | 45 | 10.9 | Present | 7 |
| 38 | U | 950 | 500 | 700 | 470 | 45 | 9.9 | Present | 5 |
| 39 | V | 935 | 500 | 720 | 460 | 45 | 10.0 | Present | 4 |
| 40 | W | 920 | 520 | 700 | 470 | 45 | 11.9 | Present | 5 |
| 41 | X | 935 | 510 | 750 | 465 | 45 | 11.3 | Present | 4 |
| 42 | Y | 940 | 520 | 700 | 470 | 45 | 10.1 | Present | 6 |
| 43 | Z | 940 | 520 | 700 | 475 | 45 | 10.9 | Present | 5 |
| 44 | AA | 935 | 500 | 745 | 460 | 45 | 11.1 | Present | 7 |
| 45 | AB | 940 | 480 | 680 | 465 | 45 | 12.0 | Present | 4 |
| 46 | AC | 940 | 480 | 670 | 670 | 45 | 11.7 | Present | 1 |
| 47 | AD | 940 | 520 | 730 | 475 | 45 | 12.0 | Present | 3 |
| 48 | AE | 930 | 510 | 700 | 470 | 45 | 11.4 | Present | 6 |
| 49 | AF | 940 | 490 | 680 | 470 | 45 | 11.5 | Present | 9 |
| 50 | AG | 940 | 480 | 690 | 480 | 45 | 10.7 | Present | 5 |
| 51 | AH | 940 | 490 | 700 | 470 | 45 | 10.4 | Absent | — |
| 52 | AI | 970 | 470 | 690 | 460 | 45 | 11.5 | Present | 5 |
| 53 | AJ | 970 | 490 | 690 | 460 | 45 | 11.9 | Present | 6 |
| 54 | AK | 970 | 500 | 670 | 480 | 45 | 11.6 | Present | 5 |
| 55 | AL | 950 | 500 | 690 | 500 | 45 | 11.6 | Present | 5 |
| 56 | AM | 950 | 470 | 650 | 500 | 45 | 11.4 | Present | 8 |
| 57 | AN | 950 | 460 | 650 | 500 | 45 | 10.7 | Present | 9 |
| 58 | AO | 950 | 460 | 650 | 500 | 45 | 11.6 | Present | 4 |
| 59 | AP | 950 | 460 | 640 | 510 | 45 | 11.6 | Present | 5 |
| 60 | AQ | 950 | 460 | 640 | 530 | 45 | 11.0 | Present | 8 |
| 61 | AR | 950 | 460 | 640 | 530 | 45 | 10.2 | Present | 5 |

TABLE 2-2

| | | Evaluation results | | | | | | |
|---|---|---|---|---|---|---|---|---|
| Level | Steel No. | TS (MPa) | EL (%) | TS × EL | Coating adhesion | Corrosion resistance | Hydrogen brittleness resistance | Remarks |
| 1 | A | 620 | 30 | 18600 | ◎ | ○ | ○ | Example |
| 2 | B | 810 | 21 | 17010 | ◎ | ○ | ○ | Example |
| 3 | C | 1010 | 15 | 15150 | ◎ | ○ | ○ | Example |
| 4 | D | 820 | 22 | 18040 | ◎ | ○ | ○ | Example |
| 5 | E | 1050 | 17 | 17850 | ◎ | ○ | ○ | Example |
| 6 | E | 1030 | 18 | 18540 | X | ○ | X | Comparative Example |

TABLE 2-2-continued

| | | Evaluation results | | | | | | |
|---|---|---|---|---|---|---|---|---|
| Level | Steel No. | TS (MPa) | EL (%) | TS × EL | Coating adhesion | Corrosion resistance | Hydrogen brittleness resistance | Remarks |
| 7 | E | 1030 | 18 | 18540 | ○ | ○ | ○ | Example |
| 8 | E | 1000 | 18 | 18000 | ◎ | ○ | ○ | Example |
| 9 | E | 1000 | 18 | 18000 | ○ | ○ | ○ | Example |
| 10 | E | 1000 | 18 | 18000 | X | ○ | ○ | Comparative Example |
| 11 | E | 950 | 14 | 13300 | X | ○ | X | Comparative Example |
| 12 | E | 1000 | 16 | 16000 | ◎ | ○ | ○ | Example |
| 13 | E | 990 | 16 | 15840 | ○ | ○ | ○ | Example |
| 14 | E | 930 | 16 | 14880 | X | ○ | X | Comparative Example |
| 15 | E | 990 | 16 | 15840 | ○ | ○ | ○ | Example |
| 16 | E | 990 | 16 | 15840 | X | ○ | ○ | Comparative Example |
| 17 | E | 990 | 16 | 15840 | ◎ | ○ | ○ | Example |
| 18 | E | 990 | 17 | 16830 | ◎ | ○ | ○ | Example |
| 19 | E | 1030 | 17 | 17510 | ◎ | ○ | ○ | Example |
| 20 | E | 1000 | 17 | 17000 | ◎ | ○ | ○ | Example |
| 21 | E | 1050 | 16 | 16800 | ◎ | ○ | ○ | Example |
| 22 | E | 1000 | 16 | 16000 | ○ | ○ | ○ | Example |
| 23 | F | 1070 | 16 | 17120 | ◎ | ○ | ○ | Example |
| 24 | G | 620 | 32 | 19840 | ◎ | ○ | ○ | Example |
| 25 | H | 820 | 23 | 18860 | ◎ | ○ | ○ | Example |
| 26 | I | 1050 | 17 | 17850 | ◎ | ○ | ○ | Example |
| 27 | J | 630 | 29 | 18270 | ◎ | ○ | ○ | Example |
| 28 | K | 810 | 21 | 17010 | ◎ | ○ | ○ | Example |
| 29 | L | 1020 | 15 | 15300 | ◎ | ○ | ○ | Example |
| 30 | M | 500 | 29 | 14500 | X | ○ | X | Comparative Example |
| 31 | N | 590 | 28 | 16520 | ◎ | ○ | ○ | Example |
| 32 | O | 590 | 33 | 19470 | ◎ | ○ | ○ | Example |
| 33 | P | 600 | 31 | 18600 | ◎ | ○ | ○ | Example |
| 34 | Q | 600 | 30 | 18000 | ◎ | ○ | ○ | Example |
| 35 | R | 620 | 29 | 17980 | ◎ | ○ | ○ | Example |
| 36 | S | 620 | 29 | 17980 | ◎ | ○ | ○ | Example |
| 37 | T | 620 | 29 | 17980 | ◎ | ○ | ○ | Example |
| 38 | U | 630 | 33 | 20790 | ◎ | ○ | ○ | Example |
| 39 | V | 600 | 31 | 18600 | ◎ | ○ | ○ | Example |
| 40 | W | 620 | 25 | 15500 | ◎ | ○ | ○ | Example |
| 41 | X | 620 | 30 | 18600 | ◎ | ○ | ○ | Example |
| 42 | Y | 830 | 22 | 18260 | ◎ | ○ | ○ | Example |
| 43 | Z | 810 | 22 | 17820 | ◎ | ○ | ○ | Example |
| 44 | AA | 810 | 21 | 17010 | ◎ | ○ | ○ | Example |
| 45 | AB | 1030 | 15 | 15450 | ◎ | ○ | ○ | Example |
| 46 | AC | 1010 | 15 | 15150 | ◎ | ○ | ○ | Example |
| 47 | AD | 1020 | 16 | 16320 | ◎ | ○ | ○ | Example |
| 48 | AE | 1030 | 15 | 15450 | ◎ | ○ | ○ | Example |
| 49 | AF | 730 | 22 | 16060 | ◎ | ○ | ○ | Example |
| 50 | AG | 1000 | 16 | 16000 | ◎ | ○ | ○ | Example |
| 51 | AH | 460 | 30 | 13800 | X | ○ | X | Comparative Example |
| 52 | AI | 610 | 30 | 18300 | ◎ | ○ | ○ | Example |
| 53 | AJ | 1050 | 15 | 15750 | ◎ | ○ | ○ | Example |
| 54 | AK | 1170 | 13 | 15210 | ◎ | ○ | ○ | Example |
| 55 | AL | 810 | 21 | 17010 | ◎ | ○ | ○ | Example |
| 56 | AM | 1030 | 15 | 15450 | ◎ | ○ | ○ | Example |
| 57 | AN | 1230 | 13 | 15990 | ◎ | ○ | ○ | Example |
| 58 | AO | 1220 | 13 | 15860 | X | ○ | ○ | Comparative Example |
| 59 | AP | 1050 | 18 | 18900 | ◎ | ○ | ○ | Example |
| 60 | AQ | 1080 | 16 | 17280 | ◎ | ○ | ○ | Example |
| 61 | AR | 1090 | 16 | 17440 | X | ○ | ○ | Comparative Example |

From Tables 2-1 and 2-2, Inventive Examples achieved good results (○) in all of coating adhesion, corrosion resistance and hydrogen brittleness resistance. In contrast, Comparative Examples falling outside the scope of the invention were performed poorly in any of these evaluations.

The invention claimed is:

1. A galvannealed steel sheet comprising a zinc coating layer on the surface of a steel sheet, the zinc coating layer containing 7 to 15 mass % Fe, the steel sheet having a chemical composition comprising, by mass %, C: 0.02% to 0.30%, Si: 0.01% to 2.5%, Mn: 0.1% to 3.0%, P: 0.003% to 0.08%, S: not more than 0.01%, Al: 0.001% to 0.20%, one, or two or more selected from Ti: 0.03% to 0.40%, Nb: 0.001% to 0.2%, V: 0.001% to 0.5%, Mo: 0.01% to 0.5% and W: 0.001% to 0.2%, and the balance comprising Fe and inevitable impurities, the zinc coating layer containing carbides including one, or two or more selected from titanium, niobium, vanadium, molybdenum and tungsten, the carbides having an average particle size of 1 nm to 20 nm, the carbides having a density of from five to fifty particles per segment, the segment being defined by dividing a cross section of the coating layer at intervals of 1 μm in a direction perpendicular to the direction of the thickness of the coating layer ($t_1$), measured in μm, the segment having an area of ($t_1$×1) $\mu m^2$.

2. The galvannealed steel sheet according to claim 1, wherein the chemical composition of the steel sheet further includes, by mass %, B: 0.0002% to 0.005%.

3. The galvannealed steel sheet according to claim 1, wherein the steel sheet is a hot rolled steel sheet.

4. The galvannealed steel sheet according to claim 2, wherein the steel sheet is a hot rolled steel sheet.

* * * * *